(12) United States Patent
Pinckney et al.

(10) Patent No.: US 7,378,361 B2
(45) Date of Patent: *May 27, 2008

(54) HIGH THERMAL EXPANSION CYCLOSILICATE GLASS-CERAMICS

(75) Inventors: Linda Ruth Pinckney, Corning, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 11/402,761

(22) Filed: Apr. 11, 2006

(65) Prior Publication Data

US 2007/0238599 A1    Oct. 11, 2007

(51) Int. Cl.
*C03C 10/04* (2006.01)
*C03C 8/24* (2006.01)

(52) U.S. Cl. .............................. 501/5; 501/15; 501/21; 501/26

(58) Field of Classification Search .................... 501/5, 501/8, 9, 15, 21, 26
See application file for complete search history.

(56) References Cited

U.S. PATENT DOCUMENTS

| | | | | |
|---|---|---|---|---|
| 5,298,332 | A | 3/1994 | Andrus et al. | 428/469 |
| 6,430,966 | B1 * | 8/2002 | Meinhardt et al. | 65/43 |
| 6,532,769 | B1 * | 3/2003 | Meinhardt et al. | 65/33.5 |
| 7,214,441 | B2 * | 5/2007 | Cortright et al. | 429/35 |

FOREIGN PATENT DOCUMENTS

JP  06-60891  * 3/1994
JP  2000-86288  * 3/2000

OTHER PUBLICATIONS

"*Glass-forming ability, sinterability and thermal properties in the systems RO-BaO-SiO₂ (R=Mg, Zn)*", C. Lara, J. Non-Crystalline Solids", 348, 2004 149-155.
"*Thick Film heaters made From Dielectric Tape Bonded Stainless Steel Substrates*," S. J. Stein, et al Electro Science Laboratories Inc. 1995.
"*On the crystal structure of pseudowollastonite (CaSiO₃)*", H. Yang. American Mineralogist, V. 84, pp. 929-932.
"*The Structure and Polytypes of α-CaSio₃ (Pseudowollastonie)*", T. Yamanaka, et al Acta Cryst. (1981), B37, 1010-1017.
"*Structure and High-Pressure Polymorphismof Strontium Metasilicate*," K. Machinda, Acta Cryst. (1982), B38, 386-389.
"*Properties and Structure of Viterous Silica.I*", R. Bruckner, J. of Non-Crystalline Solids 5 (1970) 123-175.
"Studies In the System CaO-Al₂O₃-SiO₂-H₂O, II: The Stystem CaSiO₃-H₂O", Buckner et al *American Journal of Science*, New Haven Connecticut, 1960, vol. 258 pp. 132-147.
"Crystallographic study of Ca₂BaSi₃O₉", *Zeitschrift Fur Kristallographie*, Frankfurt Am main (1961) Bd. 116, S. 263-265.
"Thermal Expansion", *Handbood of Physical Constants*, The Gological Society of American memoir 97, 1966 Section 6, 76-96.
"Glass/Metal and Glass-Ceramic/metal Seals", *Engineered Materials Handbook*, vol. 4, Tomsia, et al 493-501.

* cited by examiner

*Primary Examiner*—Karl E Group
(74) *Attorney, Agent, or Firm*—Walter M. Douglas (57) ABSTRACT

The invention is directed to highly crystalline, frit-sintered glass-ceramic compositions having a coefficient of thermal expansion in the range of 85-115×10⁻⁷° C. The primary crystal phases of the glass-ceramics of the invention possess a cyclosilicate structure. The glass-ceramic of the invention are useful as metal-to-metal, metal-to-ceramic and ceramic-to-ceramic sealing agents, and also as high-performance coating for metals and ceramics.

13 Claims, 5 Drawing Sheets

HIGH THERMAL EXPANSION CYCLOSILICATE GLASS-CERAMICS

FIELD OF THE INVENTION

The invention is directed to highly crystallized, frit-sintered glass-ceramics in which the primary crystal phases possess cyclosilicate crystal structures. The materials can be used as metal-to-metal, metal-to-ceramic and ceramic-to-ceramic sealing materials as well as high performance coatings for metals and ceramics.

BACKGROUND OF THE INVENTION

Glass-ceramics are polycrystalline materials formed by controlled crystallization of a precursor glass article. A glass-ceramic may be prepared by exposing a glass monolith to a thermal treatment for conversion to a crystalline state. This is referred to as "internal nucleation" or a "bulk" or "monolith glass-ceramic forming process."

Glass-ceramics may also be prepared by firing glass frits in what is referred to as powder processing methods. A glass is reduced to a powder state, formed to a desired shape, fired and crystallized to a glass-ceramic state. In this process, the relict surfaces of the glass grains serve as nucleating sites for the crystal phases. The glass composition, particle size, and processing conditions are chosen such that the glass softens prior to crystallization and undergoes viscous sintering to maximum density just before the crystallization process is completed. Shape forming methods may include but are not limited to extrusion, slip casting, tape casting, spray drying, and isostatic pressing.

Sintered glass-ceramic materials have properties that may make them suitable for many uses. Examples of such uses include high strength structural composites; sealing agents to effect metal-to-metal, metal-to-ceramic and ceramic-to-ceramic seals, including hermetic glass-to-metal electrical feed-through seals; and as sealing agent in microreactors and bioassay equipment. While various materials have been used as sealing agents, for example, epoxies and cements among others, improvements in this area are needed. The present invention discloses glass-ceramic materials that can be used as sealing materials, and also as high temperature coating, for metals and ceramics.

The present invention is directed to novel compositions suitable for forming glass-ceramic materials that be used in a variety of applications. In particular, the glass-ceramic materials of the invention can be used as sealing agents and as high performance coating for metals, metal alloys and ceramics.

SUMMARY OF THE INVENTION

In one aspect the invention is directed to glass-ceramic materials containing silicon dioxide and one or more of the oxides of calcium, barium and strontium in a cyclosilicate crystal structure.

In a further aspect the invention is directed to compositions comprising, in weight percent (wt. %):
  30-55% $SiO_2$,
  5-40% CaO,
  0-50% BaO,
  0.1-10% $Al_2O_3$, and
  0-40% SrO, with the provision that at least one of BaO+CaO, or SrO+CaO, or SrO+BaO+CaO is in the range of 40-65 wt. %.

In another aspect the invention is directed to compositions comprising, in weight percent (wt. %), 30-55% $SiO_2$, 5-40% CaO, 0-50% BaO, 0.1-10% $Al_2O_3$, and 0-40% SrO, and optionally or further comprise greater than zero (>0) to the indicated maximum of least one oxide selected from the group consisting of
  >0-16% MgO, and
  >0-10% ZnO, with the provision that at least one of BaO+CaO, or SrO+CaO, or MgO+CaO, or SrO+BaO+MgO+CaO is in the range of 40-65 wt. %.

In an additional aspect the invention is directed to glass-ceramic compositions that can be sintered at 900°-950° C. to produce a glass-ceramic with high crystallinity (that is, less than ~10% residual glass), low barium content (environmentally desirable), and an expansion coefficient (range: 25-700° C.) greater than $90 \times 10^{-7}/°$ C., said compositions comprising:
  38-50% $SiO_2$,
  20-40% CaO,
  0-20% BaO,
  2-6% $Al_2O_3$, and
  0-25% SrO, with the provision that at least one of BaO+CaO, or SrO+CaO, or SrO+BaO+CaO is in the range of 40-65 wt. %.

In a further aspect the invention is directed to glass-ceramic compositions comprising 38-50% $SiO_2$, 20-40% CaO, 0-20% BaO, 2-6% $Al_2O_3$, and 0-25% SrO; and further or optionally comprise at least one oxide selected from the group of:
  >0-16% MgO and
  >0-5 wt. % ZnO, with the provision that at least one of BaO+CaO, or SrO+CaO, or MgO+CaO, or SrO+BaO+MgO+CaO is in the range of 40-65 wt. %.

In an additional aspect the glass-ceramic compositions according to the invention have a coefficient of thermal expansion in the range of $85-115 \times 10^{-7}/°$ C. Further, the glass-ceramic compositions according to the invention are stable to temperatures in the range of 1000-1450° C.

In yet another aspect of the invention, the highly crystalline glass-ceramic compositions of the invention have less than 20% residual glass. In preferred compositions the glass-ceramic materials according to the invention have less then 10% glass.

DETAILED DESCRIPTION OF THE INVENTION

As used herein all compositional percentages are in weight percent (wt. %). In addition, the term "frit" as used herein means a powder, and particularly a powdered glass-ceramic precursor material/composition according to the invention.

Powder-processed (frit-sintered) glass-ceramics are useful as metal-to-metal, metal-to-ceramic, and ceramic-to-ceramic sealing materials as well as high-performance coatings for metals and ceramics. Compared with glasses, glass-ceramics offer higher use temperatures, superior mechanical properties and corrosion resistance, and a very wide range of thermal expansion coefficients (CTEs), which allow them to be used as expansion-matched seals for many different ceramics, metals and metal alloys. The ability to fill re-entrant angles and complex internal shapes by viscous flow of the molten glass during crystallization makes glass-ceramics particularly suited to applications where high strength of the system, and no leakage, are important. Highly crystalline glass-ceramic seals, with less than 20% residual glass (preferably less than 10% glass), are particularly well suited for sealing applications. The overall glass-ceramic seal can have a thermal expansion closely matched to that of the metal or ceramic substrate, and the glassy phase that remains in the final microstructure is confined to interstices and some grain boundaries, and does not form a continuous path through the seal.

Figure 1:
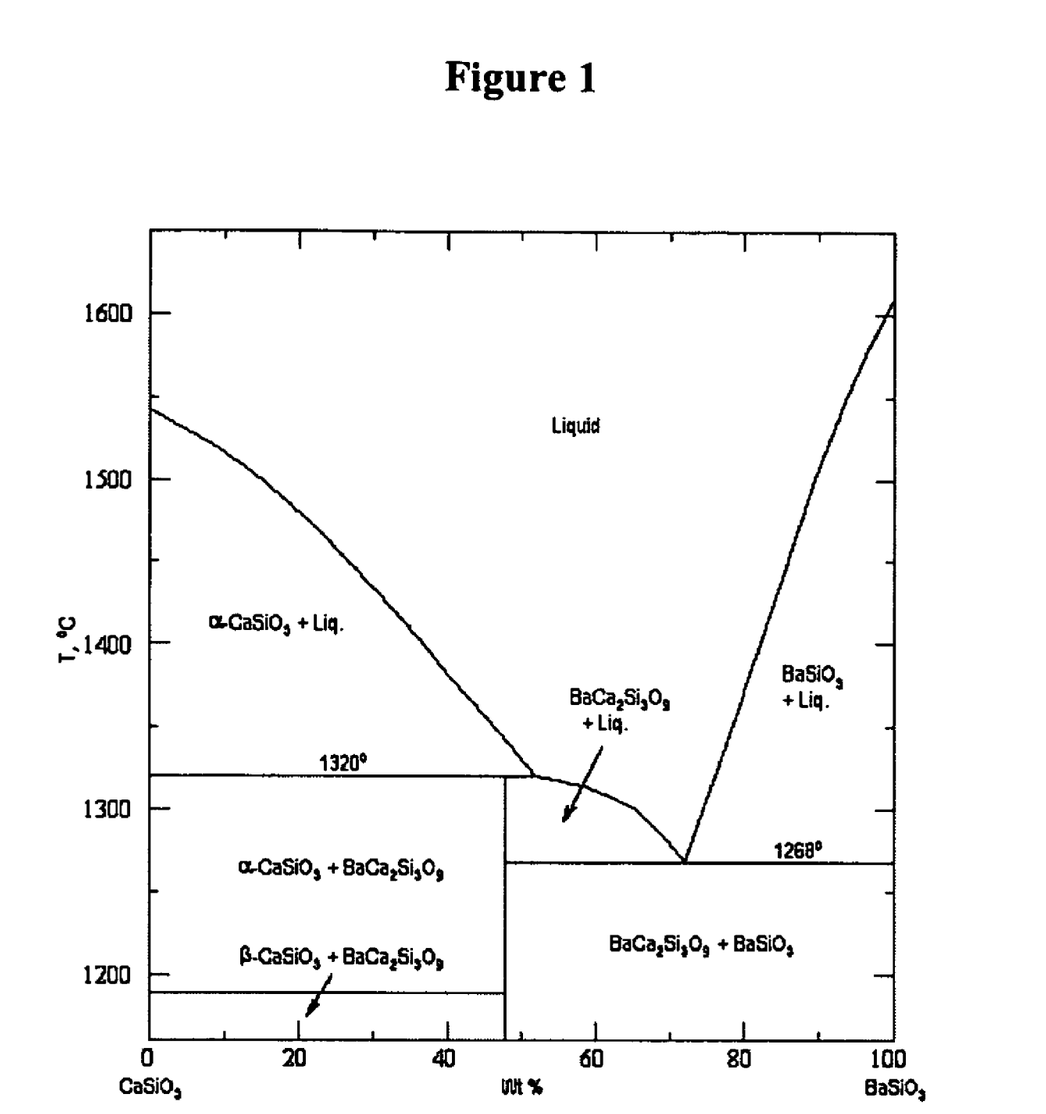
FIG. 1 is the binary phase equilibrium for $CASiO_3$—$BaSiO_3$.
Figure 2:
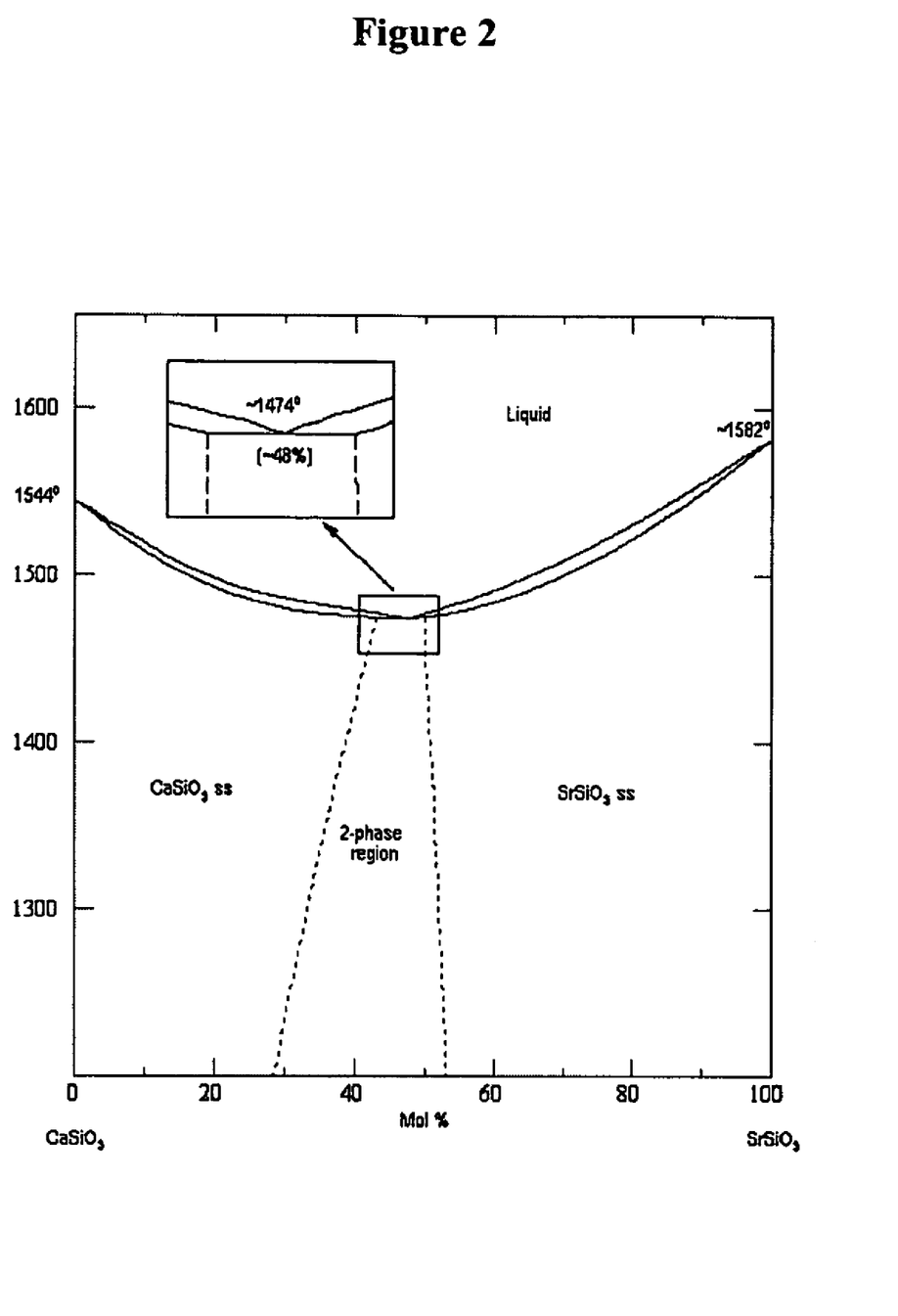
FIG. 2 is the binary phase equilibrium diagram for $CaSiO_3$—$SrSiO_3$.
Figure 3:
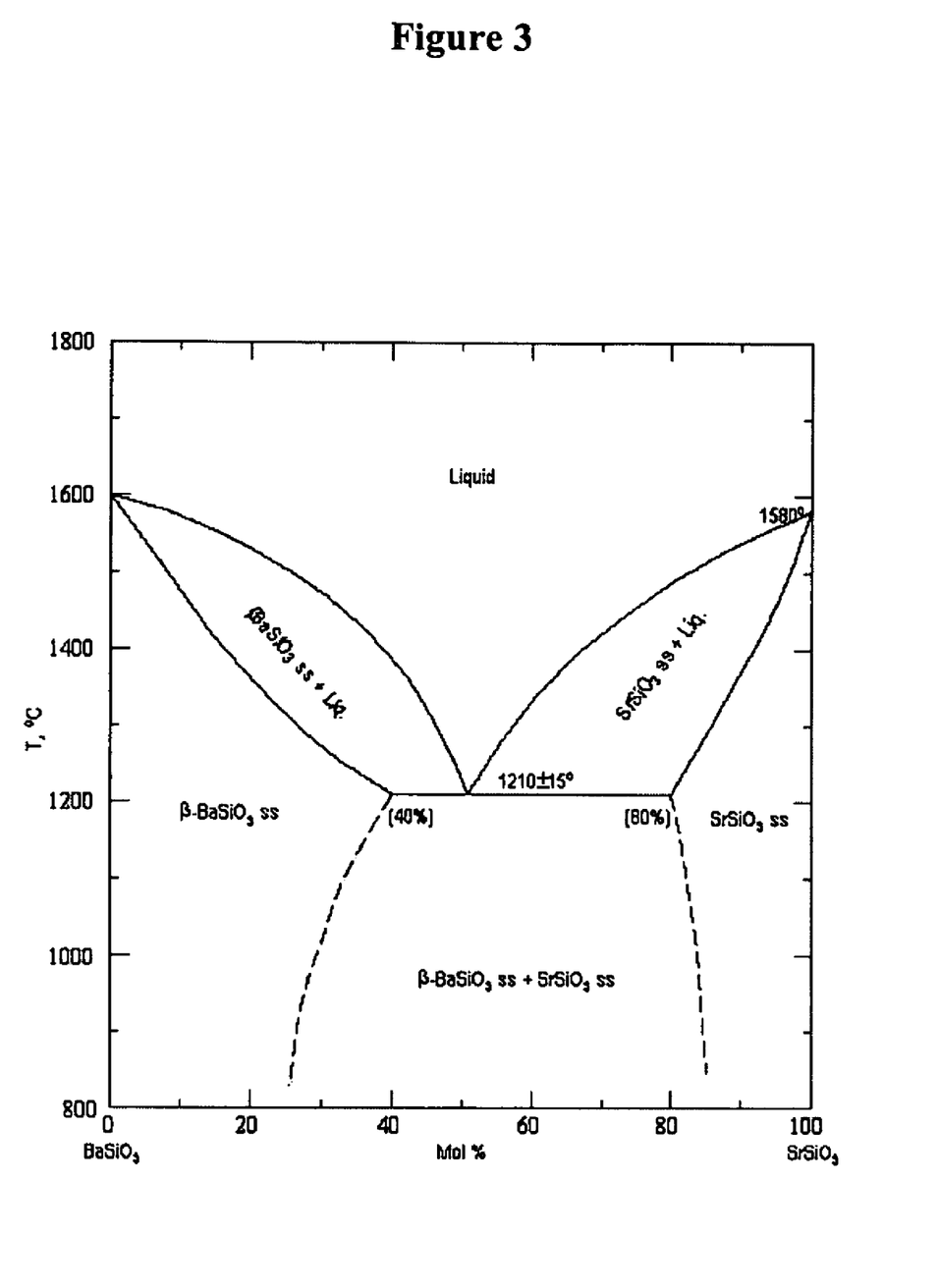
FIG. 3 is the binary phase equilibrium for $SrSiO_3$—$BaSiO_3$.
Figure 4:
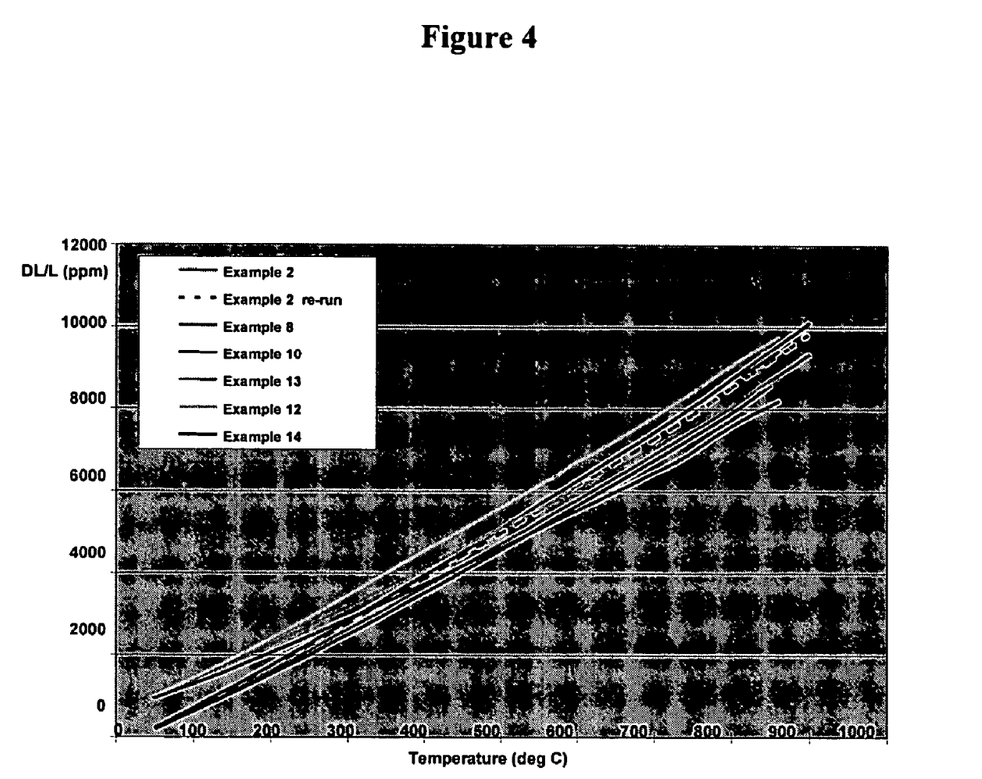
FIG. 4 illustrates the thermal expansion curves for cyclosilicate glass-ceramic compositions according to the invention shown as a plot of DL/L vs. T (° C.).

In the present invention we have found that frit-sintered glass-ceramics based on cyclosilicate crystals in the $CaSiO_3$—$SrSiO_3$—$BaSiO_3$ phase field offer both high thermal expansion and high crystallinity. The crystal phases are solid solutions of (Ca, Sr, Ba)$SiO_3$ with complex crystal structures based on three-membered rings of $SiO_4$ tetrahedra. Each end member of the series ($CaSiO_3$, $SrSiO_3$, and $BaSiO_3$) exhibits several polymorphic forms, with the α-polymorph, or ring structure, being the higher-temperature form. As in many glass-ceramic systems, the higher-temperature form is readily obtainable (stabilized) in glass, even when the room-temperature polymorph is theoretically the equilibrium structure. FIGS. 2, 3 and 4 are binary phase equilibrium diagrams (obtained from Phase Diagrams for Ceramists, Ed. E. M. Levin, C. R. Robbins, and H. F. McMurdie (American Ceramic Society, Columbus, Ohio, 1964) for $CASiO_3$—$BaSiO_3$, $CaSiO_3$—$SrSiO_3$ and $SrSiO_3$—$BaSiO_3$, respectively. No known ternary phase equilibria have been published, although it is assumed that a great deal of solid solution exists. Based on X-ray diffraction data (shown below in Table 1), three distinct but structurally-related cyclosilicate phases are obtained in these glass-ceramics. These are:

(1) α-$CaSiO_3$ (also known as pseudo-wollastonite and cyclo-wollastonite),
(2) a phase known as "μ-(Ca,Sr)$SiO_3$", and
(3) walstromite (nominally $Ca_2BaSi_3O_9$ but there appears to be solid solution in this phase as well).

TABLE 1

| | Phase | | |
|---|---|---|---|
| | walstromite | cyclo-wollastonite | μ-(Ca,Sr)SiO$_3$ |
| Chemical formula | (Ca$_{0.67}$Ba$_{0.33}$)SiO$_3$ | α-CaSiO$_3$ | (Ca,Sr)SiO$_3$ |
| Crystal form | Triclinic (Pseudo-hexagonal) | Triclinic (Pseudo-hexagonal) | "Hexagonal" (Pseudo-hexagonal?) |

TABLE 1-continued

| | Phase | | |
|---|---|---|---|
| | walstromite | cyclo-wollastonite | μ-(Ca,Sr)SiO$_3$ |
| JCPDS card | 18-162 | 31-300 | 15-314 |
| Main XRD peaks | 2.99 | 3.24 | 2.94 |
| | 6.58 | 3.22 | 3.06 |
| | 2.70 | 1.97 | 2.63 |
| | 4.40 | 3.42 | 3.18 |
| | 3.35 | 2.82 | 5.06 |
| | 5.07 | 2.45 | 2.21 |
| | 3.20 | 5.67 | 3.53 |
| | 3.06 | 5.93 | 2.99 |
| | 2.61 | 5.06 | 2.57 |
| | | 4.37 | |

While investigating these glass-ceramics to find suitable nucleating agents for bulk crystallization of the cyclosilicates of Table 1, it was noted that the stoichiometric glasses alone deformed and surface crystallized. These characteristics are exactly the properties desired in a devitrifying frit. Cyclosilicates also provide materials having high thermal expansion. For example, an internally-nucleated walstromite glass-ceramic exhibited a CTE (25-400° C.) of >100×10$^{-7}$/° C. [8], and the pseudowollastonite CTE has been reported as >90×10$^{-7}$/° C. [10]. The large amount of solid solution in these phases also allows for further tailoring of the CTE to match specific substrates. Moreover, because these compositions yield stable glasses at- or near-stoichiometry, "complete" crystallization would be expected.

While no prior art specifying glass-ceramics based on these crystal structures has been found, a publication by c. Lara et al., "*Glass-forming ability, sinterability and thermal properties in the systems RO—BaO—SIO$_2$ (R+Mg, Zn)*", Journal of Non-Crystalline Solids, 384 (2004), pages 149-155, describes sintered glass-ceramics in the system BaO—(Mg,Zn)O—SiO$_2$ that are stated to have a high thermal expansion in the range of 85-120×10$^{-7}$/° C. However, no crystal phases were identified and it is not known how much residual glass remains after crystallization in these materials. U.S. Pat. No. 5,298,332 to J. F. MacDowell and R. L. Andrus (assigned to Corning Incorporated) discloses corrosion-resistant glass-ceramic coatings for titanium alloys. The composition range of materials claimed in U.S. Pat. No. 5,298,332 is 20-75 wt % total oxides, which oxides are selected in amounts not exceeding indicated proportions from the group consisting of up to 50% BaO, 55% SrO, and 35% CaO; 25-60% SiO$_2$; 0-25% MnO; 0-20% MgO; and 0-30% other compatible bivalent and trivalent oxides. Firing temperatures range from 800° C. to 1200° C. and the CTEs (measurement range unspecified) are in the range of 80-141×10$^{-7}$/° C.

The present invention is directed to highly crystalline frit-sintered glass-ceramics having a coefficient of thermal expansion in the range of 85-115×10$^{-7}$/° C. can be obtained using the $CaSiO_3$—$SrSiO_3$—$BaSiO_3$ and $CaSiO_3$—$SrSiO_3$—$BaSiO_3$—$MgSiO_3$ systems describe herein. The primary crystal phases possess cyclosilicate crystal structures. Potential uses for these materials include sealing frits for numerous applications in which the glass-ceramics' high expansion, lack of alkali ions, refractory properties, and minimal residual glass could provide key differential advan tages. The advantages of the materials of the present invention can be summarized as follows:

1. Chemical attributes: These materials are both alkali- and boron-free (important for many high-temperature uses) and environmentally "green" (especially the Ca—Sr—Mg compositions), containing no transition metal oxides.
2. Microstructure attributes: Zero or near-zero porosity and high crystallinity. Any residual glass in the material should occupy interstices and not form a continuous path through the bulk of the material. This latter feature is particularly valuable for minimizing cation migration through the glass phase at high temperature and thereby repressing any continuing reaction between the substrate and frit. This attribute would be of particular use for seals and coatings, which must survive many hours at high temperature.
3. Refractory: Many of these materials are stable up to, and even beyond 1200° C.
4. Thermal expansion: The coefficient of thermal expansion for the materials of the invention can be tailored to match the coefficient of many metals, metal alloys and ceramics. Further, the materials according to the invention have linear (and identical) heating and cooling expansion curves. These is no hysteresis, no bend in curve. In addition, re-run samples provide identical expansion curves; the minimal residual glass of the compositions of the invention means there is no softening or permanent dimensional changes of the glass-ceramic part during thermal cycling—another potential advantage of the materials for use as microreactor seals.

Glass compositions used for preparing the glass-ceramics according to the invention were prepared by melting the component materials in vessel, for example, a platinum crucible, at a temperature in the range of 1450-1700° C. for a time in the range of 2-5 hours. The starting materials may be the oxides, carbonates, nitrates, nitrites, hydroxides and forma of the metals described herein that are known in the art to be useful in the preparation of glasses. In some embodiments, the melts were carried out at a temperature of 1600±50° C. for a time in the range of 2.5-4 hours. For each composition, a small, approximately 5 cm piece was formed from the molten glass composition and was annealed at a temperature of 750±40° C. These samples served as visual indicators of the overall glass stability. The remainder of the glass in each crucible was drigaged into water and milled to a mean particle size in the range of 10-20 μm (325 mesh). The resulting frit (frit=powdered glass) powder was formed into an article (pellets, bars, rods, etc,) using techniques known in the art. For example, for the testing purposes described herein the frit was dry-pressed into 12.76 cm diameter (0.5 inch) pellets and/or 10×0.6×0.6 cm CTE bars (4×0.25×0.25 inches), and then fired (sintered) at temperatures in the range of 850° C. to 1000° C. for a time in the range of 1-2 hours.

The glass-ceramic compositions of the invention have a coefficient of thermal expansion in the range of 85-115×$10^{-7}$/° C. Further, the glass-ceramic compositions according to the invention are stable to temperatures >1000° C., the majority to temperatures in the range of 1200-1450° C.

A range of compositions in weight percent, phase assemblages, and CTEs for compositions according to the invention are given in Table 2. All of these compositions yield stable, colorless glasses upon melting. The properties listed are for dry-pressed samples fired at 950° C. for 1 hour. The primary (predominant) crystal phase in each sample has a cyclosilicate structure. The addition of MgO and ZnO yield secondary phases such as diopside $(Ca_{0.5}Mg_{0.5})SiO_3$ (a chain silicate), å kermanite $Ca_2MgSi_2O_7$, hardystonite $Ca_2ZnSi_2O_7$, and solid solutions between å kermanite and hardystonite $Ca_2(Mg,Zn)Si_2O_7$. In one embodiment the compositions according to the invention comprise, in weight percent (wt. %):

30-55% $SiO_2$,
5-40% CaO,
0-50% BaO,
0.1-10% $Al_2O_3$, and
0-40% SrO, with the provision that at least one of BaO+CaO, or SrO+CaO, or SrO+BaO+CaO is in the range of 40-65 wt. %.

In another embodiment, the compositions according to the invention comprise, in weight percent (wt. %), 30-55% $SiO_2$, 5-40% CaO, 0-50% BaO, 0.1-10% $Al_2O_3$, and 0-40% SrO, and optionally or further comprise greater than zero (>0) to the indicated maximum of least one oxide selected from the group consisting of:

>0-16% MgO, and
>0-10% ZnO, with the provision that at least one of BaO+CaO, or SrO+CaO, or MgO+CaO, or SrO+BaO+MgO+CaO is in the range of 40-65 wt. %.

Examples of compositions according to the invention that can be used as sealing materials and/or high performance coatings are shown in Table 2.

In a further embodiment of the invention, a preferred compositional range, for optimal sintering at 900°-950° C. with high crystallinity (that is, less than ~10% residual glass), low barium content (environmentally desirable), and expansion coefficient (range: 25-700° C.) greater than $90 \times 10^{-7}$/° C., comprises:

38-50% $SiO_2$,
20-40% CaO,
0-20% BaO,
2-6% $Al_2O_3$, and
0-25% SrO, with the provision that at least one of BaO+CaO, or SrO+CaO, or SrO+BaO+CaO is in the range of 40-65 wt. %.

In another embodiment, the compositions according to the invention comprise 38-50% $SiO_2$, 20-40% CaO, 0-20% BaO, 2-6% $Al_2O_3$, and 0-25% SrO; and further or option comprise at least one oxide selected from the group of:

>0-16% MgO and
>0-5 wt. % ZnO, with the provision that at least one of BaO+CaO, or SrO+CaO, or MgO+CaO, or SrO+BaO+MgO+CaO is in the range of 40-65 wt. %.

In yet another embodiment, the compositions according to the invention comprise 45-55% $SiO_2$, 25-40% CaO, 3-6% $Al_2O_3$, 4-15% MgO, 0% BaO, 0% SrO, and optionally may include 4-8% ZnO, with the provision that CaO+MgO or CaO+MgO+ZnO is in the range 40-50%.

TABLE 2

| | Sample No. | | | | |
|---|---|---|---|---|---|
| | (1) | (2) | (3) | (4) | (5) |
| $SiO_2$ | 40.4 | 39.2 | 42.8 | 38.8 | 37.4 |
| $Al_2O_3$ | | 2.9 | | | 7.4 |
| CaO | 25.2 | 24.5 | 29.9 | 21.7 | 23.3 |
| SrO | | | | | |
| BaO | 34.4 | 33.4 | 27.3 | 39.5 | 31.9 |
| MgO | | | | | |
| ZnO | | | | | |
| Base Cyclosilicate | $(Ca_{.67}Ba_{.33})$—$SiO_3$ | $(Ca_{.67}Ba_{.33})$—$SiO_3$ | $(Ca_{.75}Ba_{.25})$—$SiO_3$ | $(Ca_{.60}Ba_{.40})$—$SiO_3$ | $(Ca_{.67}Ba_{.33})$—$SiO_3$ |
| XRD | Walst s.s. | Walst s.s. | Walst s.s. | Walst s.s. | Walst. s.s. + m. glass |
| CTE 25-700 | | 110.2 | | | 104.8 |

| | Sample No. | | | | |
|---|---|---|---|---|---|
| | (6) | (7) | (8) | (10) | (11) |
| $SiO_2$ | 35.2 | 47.8 | 45.5 | 41.0 | 39.8 |
| $Al_2O_3$ | 4.8 | | 4.8 | 4.8 | 7.4 |
| CaO | 21.0 | 35.7 | 34.0 | 19.0 | 18.5 |
| SrO | | 16.5 | 15.7 | 35.2 | 34.3 |
| BaO | 38.0 | | | | |
| MgO | | | | | |
| ZnO | | | | | |
| Base Cyclosilicate | $(Ca_{.50}Ba_{.50})$—$SiO_3$ | $(Ca_{.80}Sr_{.20})$—$SiO_3$ | $(Ca_{.80}Sr_{.20})$—$SiO_3$ | $(Ca_{.50}Sr_{.50})$—$SiO_3$ | $(Ca_{.50}Sr_{.50})$—$SiO_3$ |
| XRD | Walst. s.s. | Cyclowoll | Cyclowoll s.s. + μ s.s. | μ s.s. + m. glass | Cyclowoll + m. μ s.s. + m. glass |
| CTE 25-700 | | | 102.2 | 100.2 | |

| | Sample No. | | | | |
|---|---|---|---|---|---|
| | (12) | (13) | (14) | (15) | (16) |
| $SiO_2$ | 34.8 | 47.8 | 42.3 | 42.4 | 44.5 |
| $Al_2O_3$ | 4.8 | 4.8 | 7.1 | 3.8 | 3.8 |
| CaO | 10.9 | 27.2 | 31.6 | 29.3 | 32.3 |
| SrO | 20.0 | 12.6 | 14.6 | 7.9 | 12.7 |
| BaO | 29.6 | | | 16.5 | 6.6 |
| MgO | | 7.6 | | | |
| ZnO | | | 4.4 | | |
| Base Cyclosilicate | $(Ca_{.33}Sr_{.33}Ba_{.33})SiO_3$ | $(Ca_{.64}Sr_{.16}Mg_{.20})SiO_3$ | $(Ca_{.80}Sr_{.20})SiO_3 + ZnO$ | $(Ca_{.73}Sr_{.10}Ba_{.17})SiO_3$ | $(Ca_{.77}Sr_{.16}Ba_{.07})SiO_3$ |
| XRD | Walst + μ s.s. + glass | Cyclowoll + diop + m. aker | μ s.s. + hardy. + glass | Walst + cyclowoll + glass | Cyclowoll + m. Walst |
| CTE 25-700 | 105.9 | 94.9 | 85.5 | 108.2 | 111.3 |

| | Sample No. | | | |
|---|---|---|---|---|
| | (17) | (18) | (19) | (20) |
| $SiO_2$ | 52.4 | 50.7 | 47.9 | 46.5 |
| $Al_2O_3$ | 4.8 | 4.8 | 4.8 | 4.8 |
| CaO | 28.6 | 37.5 | 36.7 | 36.4 |
| SrO | | | | |
| BaO | | | | |
| MgO | 14.3 | 7.0 | 5.7 | 5.0 |
| ZnO | | | 5.0 | 7.4 |
| Base Cyclosilicate | | | | |
| XRD | Diopside | Diopside + m. cyclo-Woll. + Aker | Cyclo + Diop + Hard/Aker | Hardyston. + m. diop, cycl. |
| CTE 25-700 | | 98.8 | 102.5 | 97.3 |

Cyclowoll = cyclo-Wollastomite
Walst = Walstromite
Hardyston = hardystonite
Aker = åkermanite
μ s.s. = μ-(Ca,Sr)$SiO_3$
diop = diopside
m = minor While small amounts of alkalis and boric oxide can be added, these are unnecessary as well as undesirable for many applications. The addition of up to 10% $Al_2O_3$ helps stabilize the glass, delays crystallization until after some flow/sintering has taken place, and also promotes sintering at lower temperatures. However, as the amount of alumina increases, this results in more residual glass, particularly at temperatures below 1000° C. Consequently, the amount of alumina should be kept as low as possible. Higher-strontium compositions are the most refractory but require proportionately higher sintering temperatures. Up to 10% of other components such as transition metal or rare earth oxides can be added if desired; the goal being to add components that would not only promote sintering at lower temperatures, but would also partition into crystals (preferably high-expansion crystals) during the sintering/crystallization process, leaving only minimal residual glass.

The frit compositions according to the invention as shown in Table 2 remain amorphous at 800° C., and most remain primarily amorphous at 850° C. Therefore, it is preferable to first sinter at ~850° C. and then subsequently increase the temperature to >900° C. to effect crystallization. Pressed pellets held at 875° C. for 2 hours followed by a 10-minute temperature spike to 950° C., for example, give XRD patterns identical to those of pellets given the opposite treatment (that is, first a 950° C. temperature spike for 10 minutes followed by 2 hour hold at 875° C.), but are significantly tougher when subjected to hammer blows, which is an indication of improved sintering/flow prior to crystallization.

Figure 5:
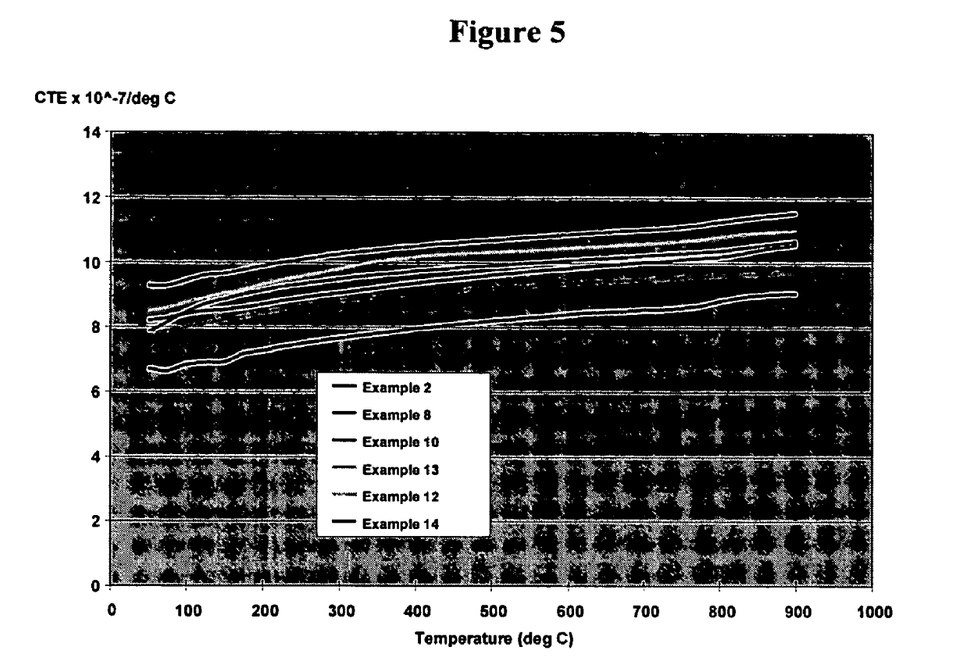
FIG. 5 illustrates the coefficient of thermal expansion (CTE) for cyclosilicate glass-ceramic compositions according to the invention shown as a plot of $CTE \times 10^{-7}/°$ C. vs. T (° C.).

FIG. 5 shows representative thermal expansion curves for these cyclosilicate glass-ceramics. The plotted curves are the heating curves; the cooling curves (not illustrates lie on top of (mirror) the heating curves. The curve for a re-run sample (a glass-ceramic bar run through the CTE measurement twice) is shown as the dotted line in the ΔL/L plot. There is no difference between the curve for the re-run sample and the curve resulting from the initial measurements. The glass-ceramic compositions of the invention have a coefficient of thermal expansion in the range of $85\text{-}115 \times 10^{-7}/°$ C. Further, the glass-ceramic compositions according to the invention are stable to temperatures in the range of 1000-1450° C.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. Glass-ceramic compositions having a cyclosilicate crystal structure, said glass-ceramics comprising in weight percent (wt. %):
   30-55% $SiO_2$,
   5-40% CaO,
   0-50% BaO,
   0.1-10% $Al_2O_3$, and
   0-40% SrO,
with the provision that at least one of BaO +CaO, or SrO +CaO, or SrO +BaO +CaO is in the range of 40-65 wt. %, and
   wherein the compositions are boron-free.

2. The glass-ceramic compositions according to claim 1, wherein said glass ceramic has a glass phase and at least one crystalline phase selected from the group consisting of walstromite, cyclo-wollastonite and μ-(Ca,Sr)$SiO_3$.

3. The glass-ceramic compositions according to claim 1, wherein said glass-ceramic optionally or further comprise greater than zero (>0) to the indicated maximum of least one oxide selected from the group consisting of:
   >0-16 wt. % MgO, and
   >0-10 wt. % ZnO,
with the provision that at least one of BaO +CaO, or SrO +CaO, or MgO +CaO, or SrO +BaO +MgO +CaO is in the range of 40-65 wt. %.

4. The glass-ceramic compositions according to claim 3, wherein said glass ceramic has a glass phase and at least one crystalline phase selected from the group consisting of walstromite, cyclo-wollastonite and μ(Ca,Sr)$SiO_3$.

5. The glass-ceramic compositions according to claim 1, wherein said glass-ceramic have a coefficient of thermal expansion in the range of $85\text{-}115 \times 10^{-7}/°$ C.

6. The glass-ceramic compositions according to claim 3, wherein said glass-ceramic have a coefficient of thermal expansion in the range of $85\text{-}115 \times 10^{-7}/°$ C.

7. A glass-ceramic compositions having a cyclosilicate crystal structure, said glass-ceramics comprising in weight percent (wt. %):
   38-50% $SiO_2$,
   20-40% CaO,
   0-20% BaO,
   2-6% $Al_2O_3$, and
   0-25% SrO,
with the provision that BaO +CaO, or SrO +CaO, or SrO +BaO +CaO is in the range of 40-65 wt. % and
   wherein the compositions are boron-free.

8. The glass ceramic-compositions according to claim 7, wherein said glass-ceramic further or optionally comprises at least one oxide selected from the group consisting of:
   >0-16 wt. % MgO and
   >0-5 wt. % ZnO,
with the provision that at least one of BaO +CaO, or SrO +CaO, or MgO +CaO, or SrO +BaO +MgO +CaO is in the range of 40-65 wt. %.

9. The glass-ceramic compositions according to claim 7, wherein said glass-ceramics have a coefficient of thermal expansion in the range of $85\text{-}115 \times 10^{-7}/°$ C.

10. The glass-ceramic compositions according to claim 8, wherein said glass-ceramics have a coefficient of thermal expansion in the range of $85\text{-}115 \times 10^{-7}/°$ C.

11. A glass-ceramic compositions comprising in weight percent (wt;
   45-55% $SiO_2$,
   25-40% CaO,
   3-6% $Al_2O_3$, and
   4-15% MgO,
with the provision that CaO +MgO is in the range 40-50, and with the further provision that BaO and SrO are approximately zero, and
   wherein the compositions are boron-free.

12. The glass-ceramic compositions according to claim 11, wherein said composition further comprises 4-8 wt. % ZnO, with the provision that CaO +MgO +ZnO is in the range 40-50.

13. The glass-ceramic compositions according to claim 11, wherein said glass-ceramic has a glass phase, a cyclosilicate phase, and at least one crystalline phase selected from the group consisting of diopside, åkermanite, and hardystonite.

* * * * *